May 7, 1929. D. BOURQUE 1,711,771

SEPARABLE FASTENER

Filed Oct. 26, 1922

Inventor:
David Bourque,
Emery, Booth, Janney & Varney
Attys.

Patented May 7, 1929.

1,711,771

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

SEPARABLE FASTENER.

Application filed October 26, 1922. Serial No. 596,982.

This invention relates to stud and socket fasteners and the object is to provide various improvements in a device of this character effecting particularly the ease and economy of its manufacture and the reliability of its operation. As an example of my invention I have herein shown a construction similar to that of my Patent 1,367,350, Feb. 1, 1921, and the specific device here illustrated might be considered as in a sense an improvement on the fastener there shown.

Figure 1:
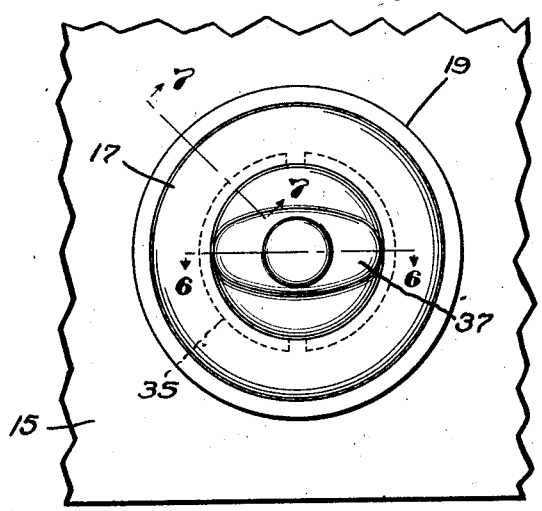
Figure 2:
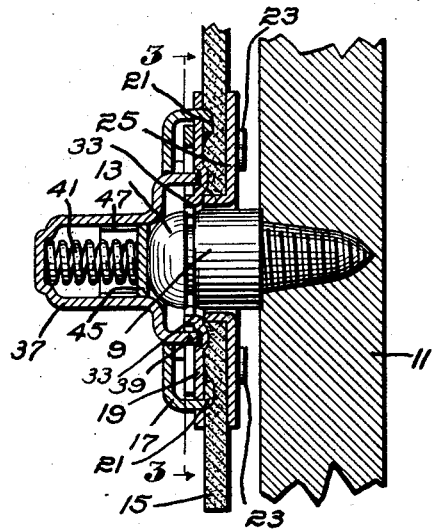
Figure 3:
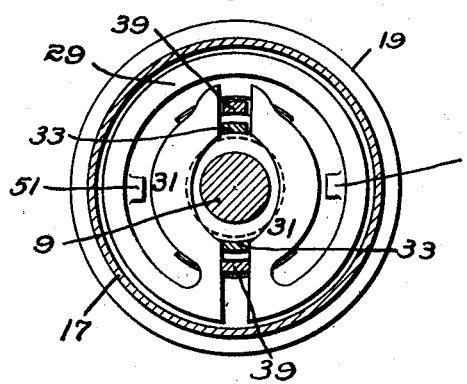
Figure 4:
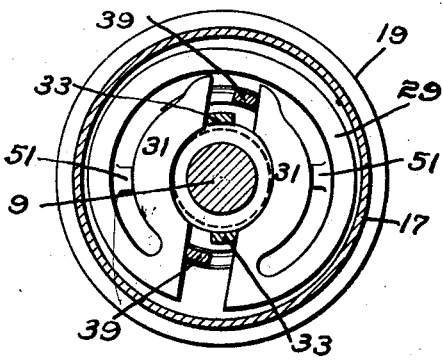
Figures 6, 7:
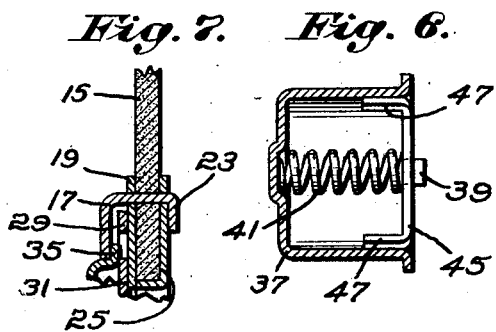
Figure 5:
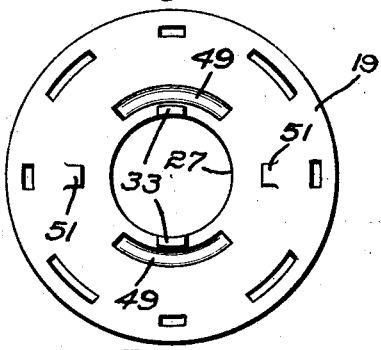

My invention will be readily understood by reference to the following description of the form of fastener shown by way of example in the accompanying drawings, wherein:

Fig. 1 is a front elevation;
Fig. 2 is a central vertical section through Fig. 1;
Fig. 3 is a section on the line 3—3 of Fig. 1;
Fig. 4 is a similar view showing the parts in another position;
Fig. 5 is an elevation of a back plate used in the construction of the socket;
Fig. 6 is a section on the line 6—6 of Fig. 1; and
Fig. 7 is a section on the line 7—7 of Fig. 1.

As I have already pointed out, constructions exemplifying the principles of my present invention are here shown as embodied in a structure of the type shown in my previous patent wherein a jaw-carrying socket member is engaged with a headed stud and may be released therefrom by manipulation of a member carried by the socket. For convenience I will describe the fastener herein shown as if it were used as a fastener for the curtains of an automobile. Referring to Fig. 2, I may utilize a stud 9 which may be secured to the body 11 of an automobile and which has a head 13 behind which are engaged the jaws of a socket member carried by a curtain 15. The socket member may comprise a casing consisting of a cup-shaped member 17, the bottom of the cup providing a front wall for the casing, and a back plate 19 secured to the flange of the cup by bent over prongs 21. The flange of the cup 17 (see Fig. 7) may further be provided with longer prongs 23 adapted to pass through the curtain 15 and be clinched on a washer 25 at the back of the curtain. The back plate 19 is provided with a suitable aperture 27 to admit the stud and a suitable jaw is disposed in the casing to engage behind the head 13 of the stud. Conveniently (see Fig. 3) the jaw system is provided by a sheet metal spring having a nearly circular marginal portion 29 terminating in substantially diametrically extending arms 31 which intersect the opening 27 and are adapted to snap behind the head 13 of the stud 9. The circular marginal portion 29 may loosely fit the casing formed by the cup 17 and the back plate 19 and to position the arms of the spring the back plate 19 may be provided adjacent the opening 27 with struck up portions 33 entering between the arms of the spring on opposite sides of the aperture 27.

To disengage the arms 31 of the spring from the stud a button for moving the same out from behind the head thereof may be carried on the casing and herein (see Fig. 2) this button comprises a circular base 34 turning in a circular opening in the front wall of the cup-like member 17 and provided with an outwardly turned flange 35 resting against the inner surface of the front wall to maintain it in position and from the circular base rises an oblate head 37 providing a convenient finger piece by which the member may be turned. To operate the spring diametrically opposed portions 39 of the flange 35 may extend as projections and enter on opposite sides of the aperture 27 between the arms 31 of the spring. Referring now to Figs. 1, 3 and 4, it will be apparent that if the button is turned clockwise viewing Fig. 1, the projections 39 will act on the arms of the spring on opposite ends of the two respectively and spring them about the bearing points provided by the positioning lugs 33, in the manner indicated in Fig. 4 and thus move the arms 31 out from behind the head 13 of the stud.

Preferably, as disclosed in my previous patent above referred to, a kick-out spring is provided for disengaging the socket from the stud when the jaws release the latter and this spring may be housed in the hollow button which serves as a manipulating means for the jaws and I have herein (see Fig. 2) shown a helical spring 41 disposed in the oblate head portion 37 of this manipulating device and acting on a follower 45, preferably of a form hereinafter more fully described, which opposes the head 13 of the stud.

It is desirable in a device of this character in order to facilitate the assembly thereof to so form the parts that they may be assembled by movements of simple superposition or dropping of the parts one over another. Thus, the button member may be assembled with the socket 17 by passing it through the opening in the front wall thereof from the right viewing Fig. 1 until the flange 35 rests against the back of the said front wall. Similarly the spring 41 may be dropped into position in the hollow member 37. One object of my invention is to provide means readily assembled in such combination for kicking out the stud when the grip of the jaws is released and which will not get out of order. For this purpose (see Figs. 2 and 6) the follower 45 takes the form of an oblate plate fitting the interior of the hollow head 37 and provided at the extremities of the major axis thereof with flanges or legs 47 providing an extended guiding surface for the follower. Referring now to Fig. 6, if we imagine the stud to be withdrawn and the spring 41 to have expanded, the legs 47 will retain the follower 45 in telescoping relation to the hollow head 37 as shown and in proper alignment therewith so that it will not become displaced. The oblate form of the head 37, besides providing for a convenient grip in turning of the device for operating the jaws, also permits a helical spring 41 of circular section to be positioned in the interior of the same while providing, as shown in Fig. 6, a clearance on opposite sides at the extremities of the major axis so that the follower 41 may be dropped into position, the legs or flanges 47 entering into the open spaces. The parts may thus be assembled and will stay assembled without the necessity of at any time compressing the spring.

To facilitate the action of the jaw operating means the projections 39 thereon which are used to displace the arms 31 of the spring may be extended beyond the normal plane of the front face of the back plate 19 and the back plate may be suitably gapped to accommodate the increased length of these projections. Referring particularly to Figs. 2 and 5, in the present example of the invention this gapping of the back plate is effected by providing embossed grooves 49 therein receiving the ends of the projections 39 in the manner indicated in Figs. 2, 3 and 4, these grooves constituting tracks in which the projection moves. Otherwise considered it might be said that the main body of the back plate 19 against which the spring rests is offset relatively to the bottoms of grooves 49 and thus the spring is supported in a position at some distance from the extremities of the projections 39. By virtue of this construction there is little chance that the spring may be displaced over the ends of these projections. It will be readily understood that if this happened the fastener would be jammed.

To further guard against such a difficulty and for other purposes as will appear I preferably provide stop means for limiting the yielding of the arms 31 when the operating button is manipulated. Herein I have shown struck-up from the back plate 19 projections 51 which are received between the marginal portion 29 of the spring and the arms 31 and against which the arms 31 seat, as shown in Fig. 4, when displaced to a predetermined extent by the turning of the operating button. By virtue of the positive stop thus provided any overstraining of the spring is prevented and an undue force will not be applied thereto which might have the effect of forcing the ends of the operating projections 39 over the face of the spring thus to jam the mechanism of the fastener.

Referring to Figs. 2 and 7 in the preferred form of my invention the securing washer 25 which is, of course, provided with an aperture aligning with the aperture 27 in the socket, may be provided marginally of this aperture with an annular flange 53 adapted to extend through the opening in the curtain 15 and terminate flush with the opening 27 in the back of the socket. There is thus provided an opening in which the stud 9 works having a smooth margin presented thereto. Thus, when the kick-out spring 41 acts to disengage the socket from the stud a smooth metallic surface is presented to the stud which slides readily over the head thereof, whereas if the flange 53, for example, were absent and the parts 19 and 25 presented edges adjacent the opening through the curtain, the shoulder of the stud might catch on one of these edges as the socket moved past the same and the release of the part under the action of the kick-out spring would thus be impeded.

Having described in detail the particular embodiment of my invention shown by way of example in the accompanying drawings, what I claim as new and desire to secure by Letters Patent I shall express in the following claims.

I claim:

1. A fastener of the type described comprising a female member having a jaw to engage a stud, a hollow button movably mounted on said member and adapted when moved to operate the jaw to release the stud, a kick-out spring housed in said button and a flanged follower on which said spring acts, the flange thereof guided on the sides of the button.

2. A fastener of the type described comprising a female member having a jaw to engage a stud, a hollow oblate button rotatably mounted on said member and adapted when rotated to operate the jaw to release the stud, a helical spring housed in the button and a follower for the spring opposing the stud having extensions received in said button at the sides of the greater diameter thereof.

3. A socket for a stud and socket fastener presenting in alignment with the stud a hollow housing, a kick-out spring received thereby and a follower for the spring to oppose the stud having legs extending into the housing to lie beside the spring therein.

4. A socket for a stud and socket fastener presenting in alignment with the stud received thereby a housing comprising two elements having telescoping side portions, one element being a movable follower having a rear wall opposing the stud, and a kick-out spring in said housing adapted to press said rear wall rearwardly past the rear end of the first element, the said two elements being in continued telescopic engagement when said spring is unstressed.

5. A socket for a stud and socket fastener having a front wall and an apertured rear wall, a jaw received between them, a button movably mounted in the front wall and having a projection to engage the jaw to operate the same, said rear wall being gapped radially outward from the aperture to receive the end of said projection.

6. A socket for a stud and socket fastener having front and rear walls, a jaw received between them, a button movably mounted in the front wall and having a projection to engage the jaw to operate the same, a portion of the rear wall being offset to support the jaw inwardly from the end of said projection.

7. A socket for a stud and socket fastener having a front wall and an apertured rear wall, a jaw received between them, a button movably mounted in the front wall and having a projection to engage the jaw to operate the same and a track on the rear wall radially outward from the aperture along which said projection moves.

8. A socket for a stud and socket fastener comprising a casing having an apertured back plate, a cooperating member providing a front wall, a yielding device positioned in the casing having arms intersecting the aperture, a button swivelled in the front wall having projections entering between said arms for moving the same, said back plate being gapped radially outward from the aperture to receive the said projections, and projections on the back plate for limiting movement of said arms by manipulation of the button.

9. A socket for a stud and socket fastener comprising an apertured back plate, a yielding jaw resting thereon, a movably mounted button in front of the jaw having a projection to engage the jaw to operate the same, said back plate being gapped radially outward from the aperture to receive the end of the projection whereby the jaw is supported by the back plate inwardly from the end of the projection.

10. A socket for a stud and socket fastener comprising a casing, a jaw in the casing for engaging a cooperating stud, a device for moving the jaw to disengage it from the stud, a kick-out spring for separating the stud and casing when the jaw is disengaged from the former, said casing comprising a back wall for application to one side of a supporting member and having an aperture to receive the stud, a washer for application to the other side of said member having an aligning aperture, said washer having a flange about the aperture therein extending into close proximity to the aperture in the back wall whereby to provide a surface over which the stud may freely pass as the parts are separated under the action of said spring.

11. A socket for a stud and socket fastener comprising a casing, a jaw in the casing for engaging a cooperating stud, a device for moving the jaw to disengage it from the stud, a kick-out spring for separating the stud and casing when the jaw is disengaged from the former and means for securing the casing to a support, said means including a washer having a flange providing a smooth and unobstructed socket wall defining a passageway for the reception of the stud when entered to engage said jaw, said passageway extending from close proximity to said jaw whereby to provide a surface over which the stud may freely pass as the parts are separated under the action of the spring.

In testimony whereof, I have signed my name to this specification.

DAVID BOURQUE.